US012545468B2

(12) United States Patent
Bardini

(10) Patent No.: US 12,545,468 B2
(45) Date of Patent: Feb. 10, 2026

(54) LABELING ASSEMBLY FOR CONTAINER LABELING MACHINES

(71) Applicant: P.E. LABELLERS S.P.A., Porto Mantovano (IT)

(72) Inventor: Riccardo Bardini, Torri del Benaco (IT)

(73) Assignee: P.E. LABELLERS S.P.A., Porto Mantovano (IT)

( * ) Notice: Subject to any disclaimer, the term of this patent is extended or adjusted under 35 U.S.C. 154(b) by 83 days.

(21) Appl. No.: 18/689,453

(22) PCT Filed: Sep. 2, 2022

(86) PCT No.: PCT/EP2022/074516
§ 371 (c)(1),
(2) Date: Mar. 6, 2024

(87) PCT Pub. No.: WO2023/036713
PCT Pub. Date: Mar. 16, 2023

(65) Prior Publication Data
US 2025/0011030 A1  Jan. 9, 2025

(30) Foreign Application Priority Data
Sep. 7, 2021  (IT) .......................... 102021000023057

(51) Int. Cl.
*B32B 41/00* (2006.01)
*B65C 3/06* (2006.01)
*B65C 9/02* (2006.01)
*B65C 9/40* (2006.01)

(52) U.S. Cl.
CPC .................. *B65C 9/40* (2013.01); *B65C 3/06* (2013.01); *B65C 9/02* (2013.01)

(58) Field of Classification Search
CPC .... B65C 9/40; B65C 3/06; B65C 9/02; B65C 9/0062; B65C 9/00
USPC .................... 156/60, 64, 350, 351, 378, 379
See application file for complete search history.

(56) References Cited

U.S. PATENT DOCUMENTS

2009/0294070 A1* 12/2009 Kellhammer ............. B65C 9/40
156/365

FOREIGN PATENT DOCUMENTS

DE   10 2016 221645 A1   5/2018
WO   2007/025592 A1   3/2007

OTHER PUBLICATIONS

European Patent Office, International Search Report and Written Opinion issued Sep. 2, 2022 which pertains to PCT Application No. PCT/EP2022/074516. 9 pgs.

* cited by examiner

Primary Examiner — Michael N Orlando
Assistant Examiner — Joshel Rivera
(74) Attorney, Agent, or Firm — THOMPSON HINE LLP

(57) ABSTRACT

A labeling assembly for container labeling machines, which includes a base framework which can be associated with the frame of a conveyor of the containers to be labeled; the base framework supports labeling elements for labeling the containers that transit on the conveyor; at least one control/command panel supports at least one user interface device for the control and/or the command of the labeling elements; the control/command panel is mounted on at least one support which can move rotatably with respect to the base framework about at least one articulation axis, in order to allow the movement of the control/command panel around the base framework.

12 Claims, 3 Drawing Sheets

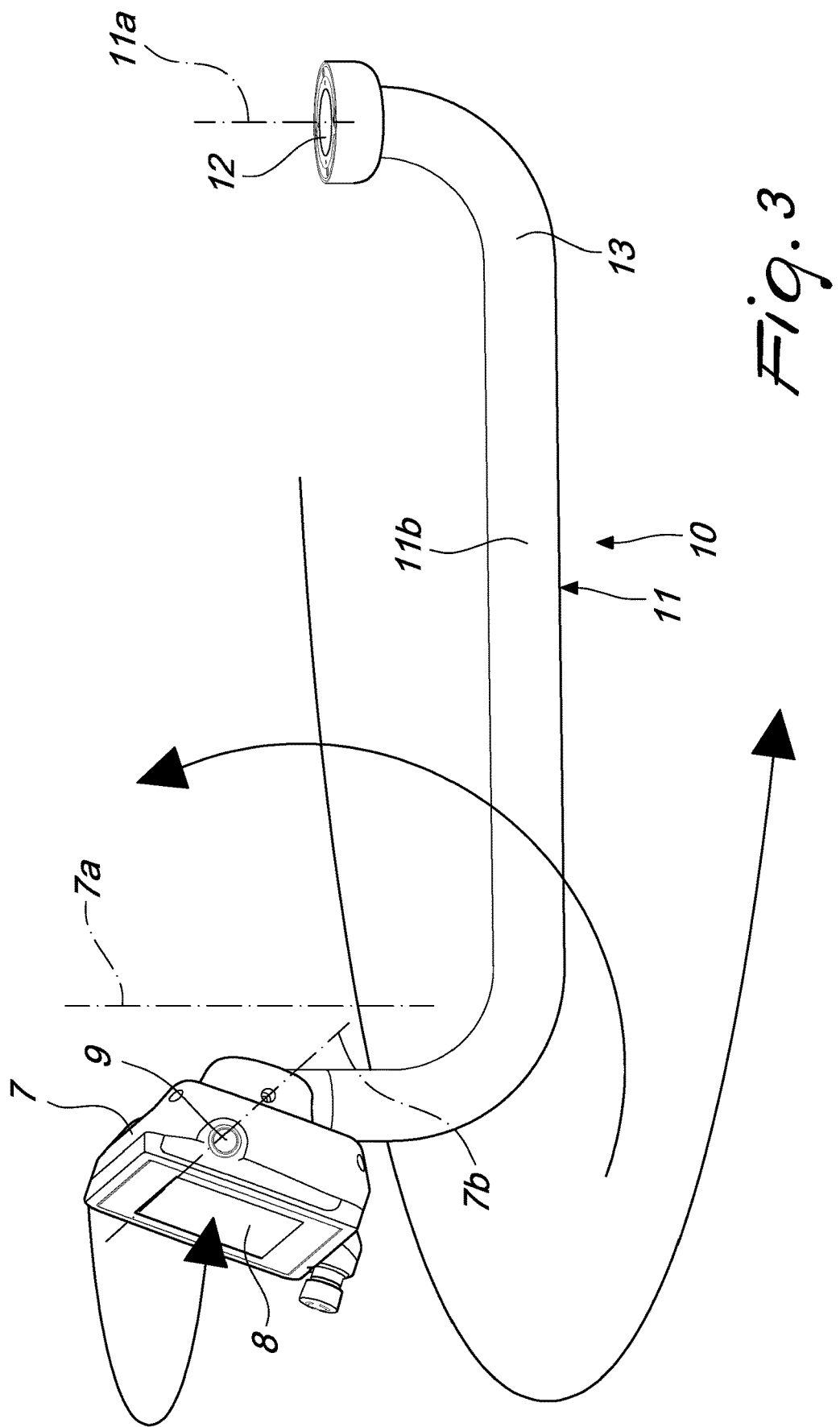

LABELING ASSEMBLY FOR CONTAINER LABELING MACHINES

The present invention relates to a labeling assembly for container labeling machines.

Labeling machines are known that make it possible to affix labels to containers, such as bottles, vials or the like.

Typically, these machines have a conveyor for the containers to be labeled that makes it possible to make the containers advance along an advancement path and which, usually, is constituted by a rotating carousel, which is provided peripherally with pans for supporting the containers, which are adapted to rotate the individual containers about their respective axes.

Along the advancement path of the containers and, in particular, around the carousel, one or more labeling units are arranged which transfer the labels onto the containers in transit on the carousel.

Usually, the labeling units have a respective base framework, which can be associated with the frame of the conveyor and on which labeling means are mounted which make it possible, by way of a transfer drum, to carry out the placing of the labels on the containers, obtaining them from a label ribbon wound in spools supported by the same base framework. The transfer drum is provided on its lateral surface with suction holes, which are connected to a vacuum pump, also mounted on the base framework, in order to make it possible to retain the label ribbon and the labels, after they have been cut, in adherence to its lateral surface.

Normally, each labeling assembly is fitted with a moving command device, known in the jargon as a "jogger", which can be carried by the operator with them and which is constituted by a panel or a box-like body that can be held by the operator with both hands and which has a number of command buttons, reduced to the minimum required in order to allow the operator to command, without needing to be physically at the control panel of the machine, the execution, by the moving components of the labeling means, of simple, controlled movements, known as "jogging movements", usually conducted at extremely low speeds, in turn known as "jogging speeds", such as for example clockwise or anticlockwise rotations of the transfer drum, which are useful during testing or during maintenance operations.

Typically, in order to command the execution of such movements, the jogger has, on mutually opposite sides, two lateral buttons that have to be pressed simultaneously by the operator using both hands, in order to ensure that the hands of the operator are always safe.

In order to enable the jogger to be mobile with respect to the base framework of the labeling assembly and so enable operators to be able to freely move around with respect to the labeling assembly during its use, the jogger is connected to the labeling assembly by a loose spiral-coiled wire.

Other controls for the labeling assembly are made available to operators on a keypad, which is located onboard the labeling assembly and which, differently from the jogger, which can move with respect to the base framework, is instead fixed to the base framework of the labeling assembly.

For example, on the keypad, in addition to an emergency button, there are buttons that make it possible for operators to control the vacuum pump or the feeding of the labels.

When the jogger and the keypad are in use, some drawbacks can be encountered.

In fact, given its mobile nature, the jogger is often subject to breakage as a result of being dropped.

Furthermore, the presence of the wire of the jogger can be the cause of the operator falling or of the jogger being dropped, since it often happened that the operator, after use, does not stow the jogger in its special seat onboard the labeling assembly, with the consequent risk that operators, by inadvertently knocking against the wire of the jogger, could trip, pull out the wire or cause the fall of the jogger from the position where it was placed by the operator.

Also, in order to operate the controls available on the keypad, the operator necessarily must physically move from one end of the labeling assembly to the other, in order to be able to reach the keypad.

The aim of the present invention is to provide a labeling assembly for container labeling machines that is capable of improving the known art in one or more of the above mentioned aspects.

Within this aim, an object of the invention is to provide a labeling assembly for container labeling machines that allows operators to operate on the labeling assembly without risk of tripping or of breakage.

Another object of the invention is to provide a labeling assembly for container labeling machines that is convenient and of practical use for operators.

A further object of the present invention is to overcome the drawbacks of the background art in a manner that is alternative to any existing solutions.

Another object of the invention is to provide a labeling assembly for container labeling machines that is highly reliable, relatively easy to implement and of low cost.

This aim and these and other objects which will become better apparent hereinafter are achieved by a labeling assembly for container labeling machines according to claim 1, optionally provided with one or more of the characteristics of the dependent claims.

Further characteristics and advantages of the invention will become better apparent from the description of a preferred, but not exclusive, embodiment of the labeling assembly for container labeling machines according to the invention, which is illustrated by way of non-limiting example in the accompanying drawings wherein:

FIG. 3 is a perspective view of a supporting arm of the control/command panel.

Figure 1:
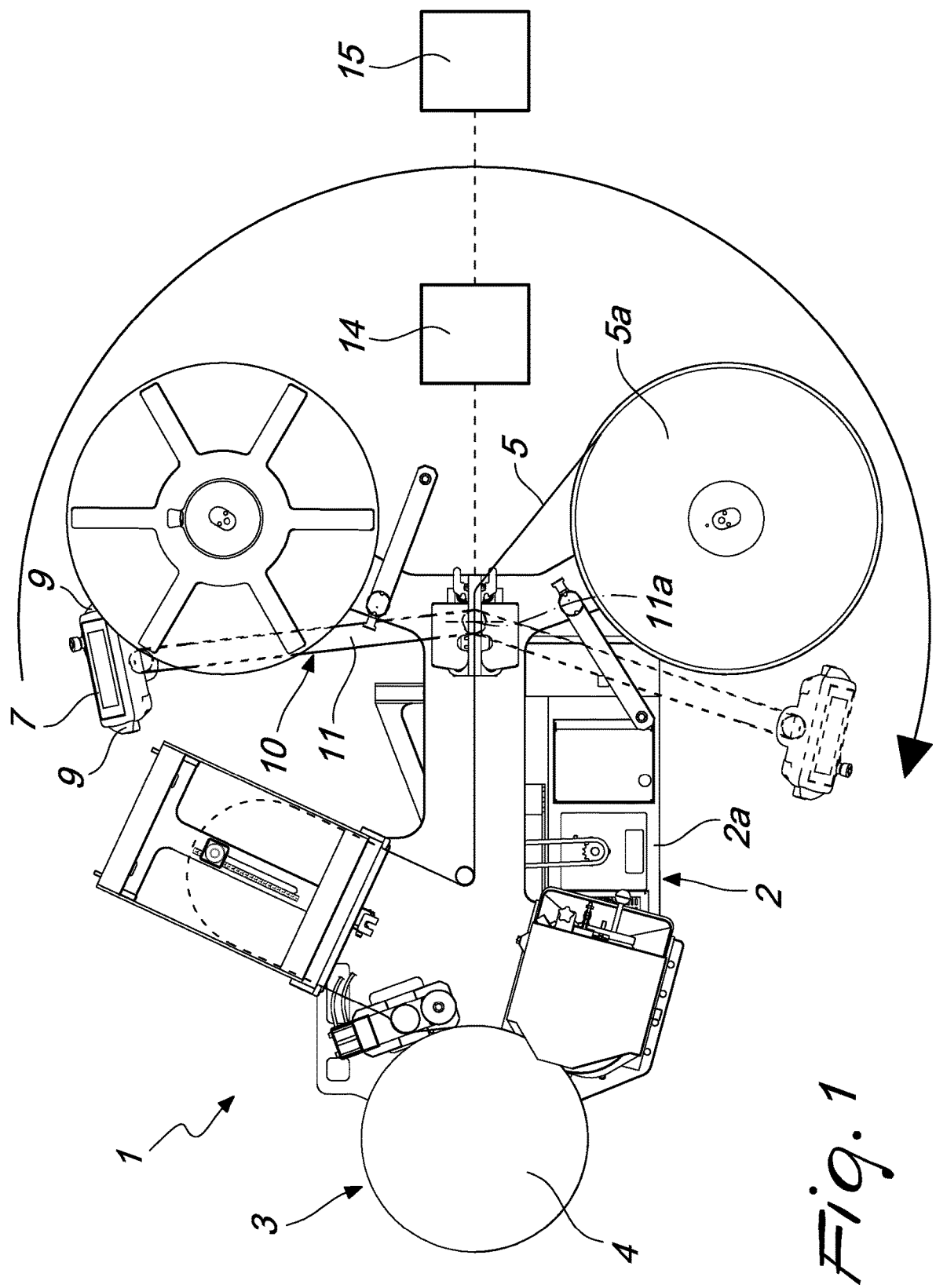
FIG. 1 is a plan view from above of the labeling assembly according to the invention.
Figure 2:
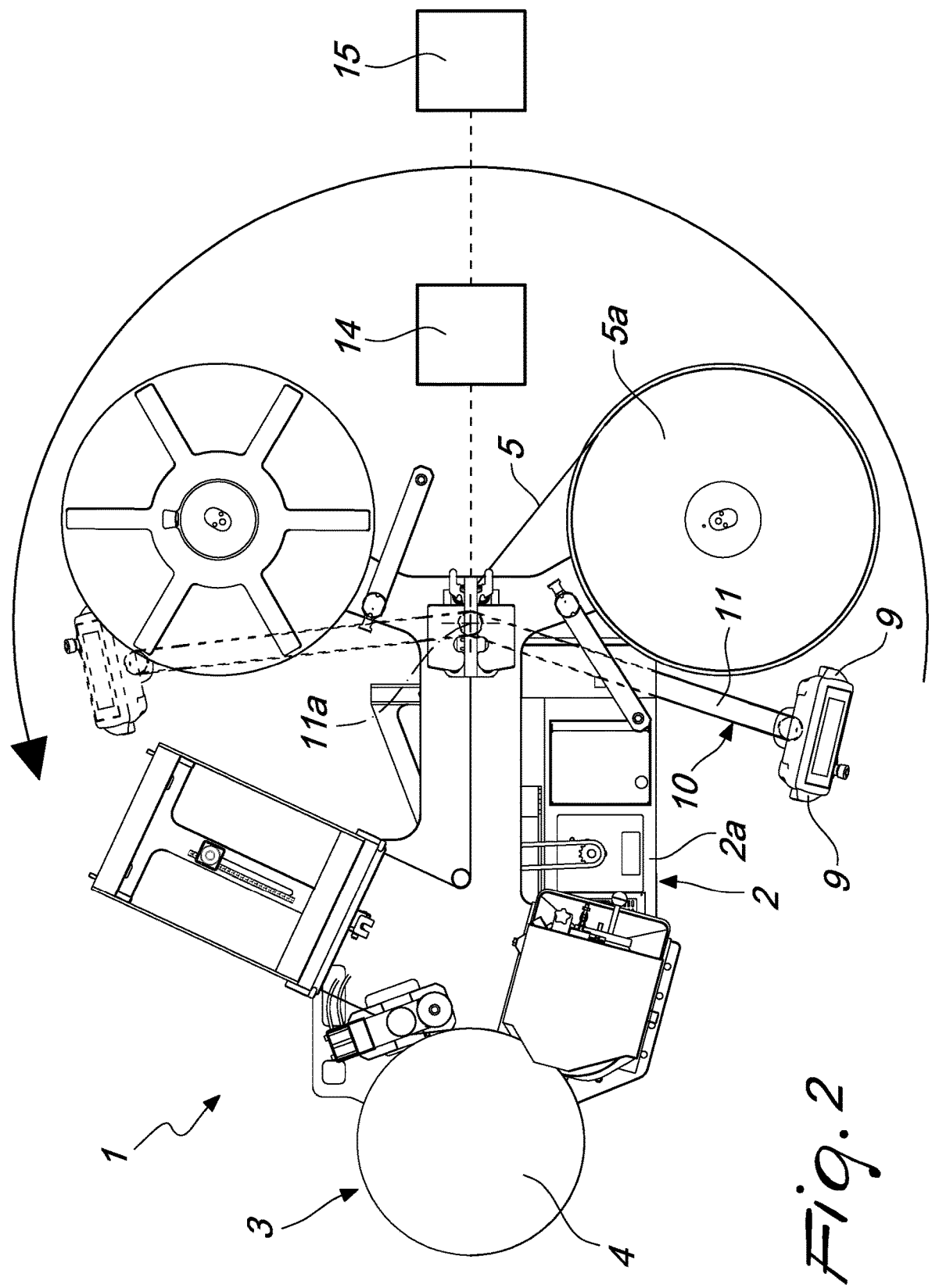
FIG. 2 is another plan view from above of the labeling assembly according to the invention but with a control/command panel in a different position with respect to FIG. 1.

With reference to the figures, the labeling assembly according to the invention, generally designated by the reference numeral 1, comprises a base framework 2, which can be associated with the frame of a conveyor of containers to be labeled (not shown).

It should be noted that the base framework 2 can be integrally coupled to the frame of the conveyor for the containers, or it can be detachably connected thereto and, in such case, it can be mounted on a trolley for movement and conveyance, in a way that is per se known.

The base framework 2 supports labeling means 3 for labeling the containers transiting on the conveyor, which can, for example, comprise, as is per se known, a transfer drum 4 which makes it possible to place labels taken from a label ribbon 5 wound on a spool 5a on the containers.

Conveniently, the labeling means 3 are mounted on a worktable 2a, defined in an upward region by the base framework 2.

According to the invention, the labeling assembly is provided with at least one control/command panel 7, which supports at least one user interface device, which enables operators to control and/or command the operation of the labeling assembly and, in particular, to control the operations of the labeling assembly and of its components, such as, for example, the feeding of the label ribbon or the action of the vacuum pump, and/or to command the execution of jogging movements, thus basically combining, in a single device, the functions that, in the labeling assemblies, are instead separately carried out by the jogger and by the keypad.

In particular, the user interface device comprises, advantageously, at least one screen 8, conveniently programmable, which enables the operating data of the labeling assembly to be displayed, thus enabling the operator to have onscreen any control data necessary for the effective operation of the labeling assembly.

Conveniently, the screen 8 can be of the touchscreen type, so as to enable the operator, by touching and pressing on specific regions of the screen 8, to send settings or commands to the labeling assembly.

Advantageously, the user interface device further comprises at least two lateral command buttons 9, located on mutually opposite sides with respect to the screen 8, which make it possible to command the execution of jogging movements by the labeling means, following their simultaneous actuation by the operator, thus placing the operator's hands in safety.

Also according to the invention, the control/command panel 7 for supporting is mounted on at least one support, advantageously constituted by at least one supporting arm 11, which can move rotatably with respect to the base framework 2 about at least one articulation axis 11a, conveniently oriented substantially vertically, in order to allow the movement of the control/command panel 7 around the base framework 2.

In particular, the supporting arm 11 at least partially protrudes laterally with respect to the perimeter space occupation of the base 20 framework 2, so as to support the control/command panel 7 in a cantilever fashion with respect to the base framework 2, and so that, by way of oscillating the supporting arm 11 about its own articulation axis 11a, it is possible to angularly move the control/command panel about the perimeter of the base framework 2.

More specifically, the supporting arm 11 is conveniently hinged, at a first end thereof, to the base framework 2 about the above-mentioned articulation axis 11a and has, at its intermediate part, at least one portion 11b that extends substantially radially with respect to the articulation axis 11a.

Preferably, the supporting arm 11 is rotatably connected, with the first end thereof, to a portion of the base framework 2 which is arranged in a downward region with respect to the worktable 2a.

The control/command panel 7 is, in turn, connected to a second end of the supporting arm 11, opposite to its first end, preferably so as to be able to rotate about one or more rotation axes 7a, 7b, substantially at right angles to each other, so as to allow the inclination of the screen 8 to be adjusted for the optimal viewing thereof by the operators.

Advantageously, the supporting arm 11 defines, preferably inside it, at least one passage channel 12 for accommodating at least one electrical cable, not shown, which is connected to the control/command panel 7 and to the labeling means 3, such as, for example, an electric power supply cable and/or a signal transmission cable, so as to avoid the presence of loose wires between the control/command panel 7 and the labeling means 3.

More preferably, the supporting arm 11 is constituted by at least one tubular body 13, the axial cavity of which conveniently defines the passage channel 12.

The supporting arm 11 and, more specifically, the tubular body 13 that constitutes the supporting arm 11 are made of rigid material, such as, for example, a metallic material.

In this manner, the control/command panel 7 can be arranged only in the positions defined by the angular position of the supporting arm 11, so that it can always be left by operators in positions that are considered correct.

As shown in FIG. 3, the tubular body 13 that constitutes the supporting arm 11 can have, at the first end and the second end of the supporting arm 11, terminal portions that are folded upward, one rotatably connected to the base framework 2 in a position below the worktable 2a, as previously indicated, and the other one connected to the control/command panel 7, as shown in FIG. 3.

Advantageously, the labeling assembly is further provided with a control unit 14, which is constituted, for example, by an electronic control unit, conveniently mounted on the base framework 2, which is operatively connected to the screen 8 and to detection means 15 for detecting the angular position of the support 10 and, more specifically, of the supporting arm 11 relative to the base framework 2 about the oscillation axis 11a, which are constituted, for example, by an angular position transducer.

In particular, the control unit 14 is configured so as to command, as a function of the angular position of the support 10 detected by the detection means 15, the displaying by the screen 8 of control data related to the region of the labeling means 3 in which the support 10 is located.

The use of the labeling assembly, according to the invention, is the following.

The operator who is on one side of the labeling assembly can control or command its operation using the control/command panel 7 supported by the supporting arm 11 which protrudes laterally from the base framework 2 of that labeling assembly.

If the operator needs to change position and move, for example, to the opposite side of the labeling assembly, he or she can make the supporting arm 11 rotate about its own articulation axis 11a, so as to move the control/command panel 7 angularly around the base framework 2, so as to also be able to bring the control/command panel 7 to its new position, without the risk of knocking against loose wires or getting wires tangled in the components of the labeling assembly.

On the basis of the angular position assumed by the supporting arm 11 about the articulation axis 11a, the control data that the operator may need in the specific region in which the supporting arm 11 is located will appear on the screen 8 of the control/command panel 7.

By actuating the two lateral command buttons 9 with both hands, the operator can, using the control/command panel 7, also command the execution of jogging movements by the moving components of the labeling means 3.

In practice it has been found that the invention fully achieves the intended aim and objects by providing a labeling assembly for labeling machines that enables a much more practical and safe use of the corresponding control/command panel with respect to the known art.

It is further emphasized that, by virtue of its peculiar architecture, the control/command panel with which the labeling assembly is provided, in addition to comprise the functionalities of a traditional jogger, by means of the screen allows to implement and exceed the functionalities of a traditional keypad.

It should also be noted that the fact that it is mounted on a support that can rotate with respect to the base framework of the labeling assembly makes it possible to have the control/command panel always available to the operator, but without the presence of loose wires which may be hazardous.

The invention, thus conceived, is susceptible of numerous modifications and variations, all of which are within the scope of the appended claims.

Thus, for example, the supporting arm can also be, optionally, constituted by at least two intermediate portions which are mutually connected by means of at least one joint.

Moreover, all the details may be substituted by other, technically equivalent elements.

In practice the materials employed, provided they are compatible with the specific use, and the contingent dimensions and shapes, may be any according to requirements and to the state of the art.

The disclosures in Italian Patent Application No. 102021000023057 from which this application claims priority are incorporated herein by reference.

The invention claimed is:

1. A labeling assembly for container labeling machines, which comprises a base framework which is configured to be associated with the frame of a conveyor of containers to be labeled and supports labeling means for labeling the containers that transit on said conveyor, and further comprising at least one control/command panel, which supports at least one user interface device for control and/or command of said labeling means, said control/command panel being mounted on at least one support which is configured to move rotatably with respect to said base framework about at least one articulation axis, in order to allow a movement of said control/command panel around said base framework;
wherein said support comprises at least one supporting arm which protrudes at least partially with respect to a perimeter space occupation of said base framework and wherein said supporting arm is articulated to a portion of said base framework which is located below a worktable that is defined by said base framework and on which said labeling means are mounted.

2. The labeling assembly according to claim 1, wherein said articulation axis is oriented substantially vertically.

3. The labeling assembly according to claim 1, wherein said supporting arm is hinged, at a first end thereof, to said base framework about said articulation axis and has at least one portion that extends substantially radially with respect to said articulation axis, said supporting arm being connected, at a second end thereof, opposite to the first end, to said control/command panel.

4. The labeling assembly according to claim 3, wherein said control/command panel is connected rotatably to said second end of said supporting arm about at least one rotation axis.

5. The labeling assembly according to claim 1, wherein said supporting arm defines at least one passage channel for at least one electrical cable connected to said control/command panel and to said labeling means.

6. The labeling assembly according to claim 1, wherein said supporting arm is constituted by at least one tubular body made of rigid material.

7. The labeling assembly according to claim 6, wherein said at least one tubular body has, at said first end and said second end of said supporting arm, terminal portions that are folded upward.

8. The labeling assembly according to claim 1, wherein said supporting arm comprises at least two portions which are mutually connected by means of at least one joint.

9. The labeling assembly according to claim 1, wherein said at least one user interface device comprises at least one screen for displaying control data of said labeling means.

10. The labeling assembly according to claim 1, wherein said at least one user interface device comprises at least two lateral command buttons which are designed to be actuated simultaneously with both hands by an operator in order to command execution of jogging movements by said labeling means.

11. The labeling assembly according to claim 1, further comprising a control unit which is operatively connected to said screen and to detection means for detecting an angular position of said support with respect to said base framework, said control unit being adapted to command, as a function of the angular position of said support detected by said detection means, displaying by said screen of control data related to a region of said labeling means in which said support is located.

12. The labeling assembly of claim 1, wherein an end of the supporting arm is rotatably connected to the portion of the base framework that is located below the worktable such that at least part of the supporting arm extends beneath the worktable when said control/command panel is located in a position that rotationally aligns with the worktable.

* * * * *